G. M. J. CHEVOIR.
CHUCK.
APPLICATION FILED DEC. 11, 1917.
1,280,396.
Patented Oct. 1, 1918.
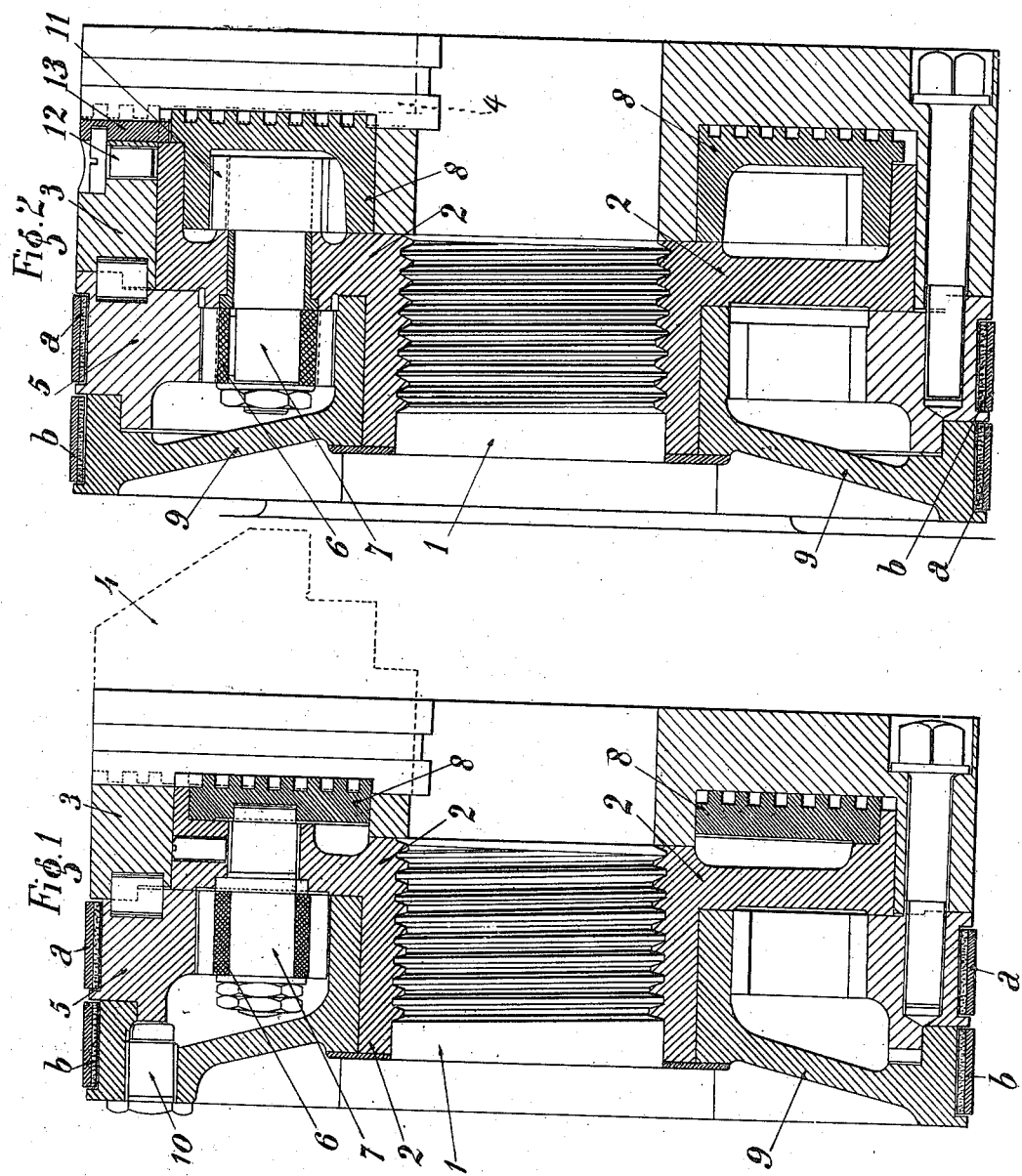

UNITED STATES PATENT OFFICE.

GUILLAUME MARIE JOSEPH CHEVOIR, OF PARIS, FRANCE.

CHUCK.

1,280,396.

Specification of Letters Patent.

Patented Oct. 1, 1918.

Application filed December 11, 1917. Serial No. 206,689.

*To all whom it may concern:*

Be it known that I, GUILLAUME MARIE JOSEPH CHEVOIR, citizen of the Republic of France, residing at 30 Rue Saint Charles, Paris, in the Republic of France, have invented new and useful Improvements in Chucks, of which the following is a specification.

The object of this invention is to provide a chuck in which the work may be reliably clamped and quickly released, these movements being made without involving the necessity of stopping the machine tool and requiring only a small amount of force on the part of the workman.

To this end the chuck is combined with a differential mechanism, and the entire device is essentially characterized by the fact that the chuck body or part carrying the jaws is mounted to run loosely on the spindle of the machine tool, and the spiral grooved ring can be mounted fixed or loose upon this spindle.

As in the case of the usual devices, clamping and release of the work is effected by braking action upon the differential parts, but in the present chuck the clamping which is effected by braking action upon the chuck body is carried out in a sure and positive manner from the fact that it can be completed automatically in case of insufficiency, by the action of the tools upon the work, and in this case said action is manifested by a braking effect upon the piece which is already connected with the chuck body, and this braking causes the movement of the chuck body to be slowed up with reference to the movement of the spindle. This slowing is made possible from the fact that the chuck body is mounted loose upon the spindle. As in the usual methods, where the chuck body, on the contrary, is attached to the spindle the braking action of the tools would have the effect of slowing down the speed of the entire makeup composed of the spindle, chuck and work piece and this would have no effect as concerns the clamping of the work.

It can also be pointed out that as the braking effect is exerted by braking upon the chuck body, the work piece can be put in place more easily from the fact that the movement of the chuck body is slowed down, or can even be stopped for a short space of time.

It has been already stated that the spiral grooved ring can be either attached to the spindle or mounted loose upon the same. In the latter case, said ring is included in the movement of the differential, and the braking action for clamping and release of the work takes place in an easier and more gradual way and at the same time is rapidly effected, and this saves wear upon the working parts of the chuck.

In the accompanying drawing,

Figures 1 and 2 represent sectional views of two methods of designing the chuck according to this invention. The sections are made in each case through two radial planes of the chuck, and are supposed to be placed in the vertical plane. Fig. 1 represents a chuck carrying a spiral grooved ring fixed to the spindle, and Fig. 2 on the contrary, represents a device in which the ring is mounted to run loosely.

It is observed, in Fig. 1 that the plate 2 is attached to the spindle, and the chuck body 3 is disposed to rotate freely upon the plate, said chuck body carrying the jaws 4 whose movement is limited to a radial displacement in suitable grooves.

On the chuck body 3 is mounted a disk or ring 5 toothed on the inner side, while the outer surface forms a brake drum $a$. This ring engages with one or more satellite gears 6 mounted loose upon corresponding journals 7 which are attached to the plate 2.

Within this plate and drawn along with the same is a spiral grooved ring 8 which consequently follows the movement of the spindle.

The disk 9 is provided with outer gear teeth and also forms a brake drum $b$, this disk engaging with the satellite gears 6 and running loose on the plate 2.

The angular displacement of the chuck-body 3—5 with reference to the disk 9 is limited in both directions by the stop screws 10. The bosses upon the periphery of the ring 5 are applied against said stop screws.

Under usual working conditions, the entire device just described is rotated along with the spindle.

Any action exerted upon the brake drum $b$ tends to slow up or stop the disk 9, and in this case it operates the chuck body through the satellites 6, these latter being always moved at the same speed as the spindle.

Outside of its movement at the same speed as the spindle the chuck body thus receives an additional movement in the same sense which through the action of the spiral, gives it a relative angular displacement which causes the release of the jaws.

This release being effected by braking upon the drum $b$ and limited by a suitable adjustment, all that is then required is to place the work between the jaws (by hand or by mechanical means) and to operate the brake $a$ in order to effect a sufficient commencement of the clamping action. The brake drum $a$ in fact stops or slows the chuck body 3—5 and thus slows it with reference to the spiral 8 which is rotating at the same speed as the spindle, and this produces a movement of the jaws contrary to the preceding clamping movement. As the work is now clamped, it may be considered as attached to the jaws and consequently to the chuck body.

The tools when brought to bear upon the metal will cause a braking action on the work which is transmitted to the chuck body through the jaws and will produce an extra braking action upon $a$. The braking force will therefore always be proportional to the cutting force, and this will produce a reasonable clamping effect, neither too great nor too small.

Braking can be carried out upon the pieces 9 and 5 at the outside of the device equally well by shoe brake, band brake, etc., or on the inside of the device. The fixed points for the braking may be chosen either upon the stationary stock or upon the lathe bench.

In the arrangement shown in Fig. 2, the spiral grooved disk is mounted loose on the plate 2 and consequently with reference to the spindle. On the inner side it carries toothed gearing which engages with the satellites 11 attached to the shafts 7 and these latter rotate freely in bored holes in the plate 2. The satellites 6 are themselves attached to these shafts 7.

In normal operation, the entire device is rotated by means of the spindle.

Any action upon the brake drum $b$ has the effect of slowing or stopping the piece 9; and in such case this piece operates respectively the chuck body and the spiral, through satellites 6 and 11 which are always operated at the same speed as the spindle.

Outside of their movement at the same speed as the spindle, these two parts thus take an additional movement in the same sense.

The difference in speed corresponding to these two movements is manifested as an angular displacement of the spiral 8 with reference to the chuck body, or in other terms, by a displacement of the jaws which serves for the release.

This displacement can be obtained at the required speed by the proper choice of the teeth in the toothed disks and the satellite gears, at the same time securing a suitable gear reduction.

The release thus obtained by the braking action on the drum $b$ is limited by a suitable adjustment of the piece 13 with reference to the peripheral projections on the spiral grooved disk 8. The piece 13 is locked by the screw 12. All that is required is to place the work between the jaws (by hand or by mechanical means) and to act upon the brake $a$ in order to effect a sufficient commencement of the clamping action. In this case the brake drum slows or stops the toothed disk 5 attached to the chuck body 3, effects a contrary movement of the spiral grooved disk 8, through the double satellites 6—11 whose shafts always rotate at the same speed as the spindle.

As long as the braking action is kept up, this differential movement is subtracted from the movement of the spiral grooved disk which latter movement is effected at the same speed as the spindle. The result is a relative movement of the spiral grooved disk with reference to the spindle and in consequence a movement of the chuck body 3 which causes a displacement of the jaws in the contrary sense to the preceding movement and this movement is utilized for the clamping. As above stated, the braking action exerted by the tools on the work completes the clamping effect.

Having now described my invention, what I claim as new and desire to secure by Letters Patent is:

1. A chuck containing, in combination, a spiral grooved ring, a chuck body proper mounted to run loosely upon the lathe spindle, jaws having a radial movement in said chuck body and engaging with the grooves of the spiral grooved ring, a differential device connected with said chuck body, and means for exerting a braking action upon said differential device, substantially as described and for the purpose set forth.

2. A chuck containing, in combination, a spiral grooved ring mounted to run loosely upon the lathe spindle, a chuck body proper also mounted to run loosely upon said spindle, jaws having a radial movement in said chuck body and engaging with the grooves of the spiral grooved ring, a differential device connected with said spiral grooved ring and with the chuck body, and means for exerting a braking action upon said differential device, substantially as described and for the purpose set forth.

3. A chuck containing, in combination, a plate fixed upon the lathe spindle, a spiral grooved ring provided with inner gear teeth and mounted to run loosely with reference to said plate, a chuck body mounted loosely with reference to said plate, jaws having a movement in radial grooves in said chuck body and engaging with the grooves of the spiral grooved ring, an inner toothed disk attached to the chuck body, an outer toothed disk mounted to run loosely upon the above-mentioned plate, shafts with free rotation in bearings provided upon said plate, two series of satellite gears attached to said shafts, one of which gears engages with the inner gear teeth of the spiral grooved ring, and the other gear engages on the one hand with the inner toothed disk and on the other with the outer toothed disk, brake drums disposed upon each of these two disks, means for exerting a braking action, and means for limiting the relative angular displacement of the chuck body and the spiral grooved ring, substantially as described and for the purpose set forth.

In testimony whereof I have signed my name to this specification in the presence of two subscribing witnesses.

GUILLAUME MARIE JOSEPH CHEVOIR.

Witnesses:
   CHAS. P. PRESSLY,
   HECTOR LEVY.